US009529427B2

(12) United States Patent
Raghoebardayal et al.

(10) Patent No.: US 9,529,427 B2
(45) Date of Patent: *Dec. 27, 2016

(54) SYSTEM AND METHOD OF IMAGE RENDERING

(71) Applicant: Sony Computer Entertainment Europe Limited, London (GB)

(72) Inventors: Sharwin Winesh Raghoebardayal, London (GB); Simon Mark Benson, London (GB); Ian Henry Bickerstaff, London (GB)

(73) Assignee: Sony Computer Entertainment Europe Limited (GB)

( * ) Notice: Subject to any disclaimer, the term of this patent is extended or adjusted under 35 U.S.C. 154(b) by 417 days.

This patent is subject to a terminal disclaimer.

(21) Appl. No.: 14/072,922

(22) Filed: Nov. 6, 2013

(65) Prior Publication Data

US 2014/0132601 A1    May 15, 2014

(30) Foreign Application Priority Data

Nov. 9, 2012 (GB) .................................. 1220219.8
Feb. 25, 2013 (GB) .................................. 1303305.5

(51) Int. Cl.
*G06T 17/00* (2006.01)
*G06F 3/01* (2006.01)
(Continued)

(52) U.S. Cl.
CPC .............. *G06F 3/012* (2013.01); *A63F 13/10* (2013.01); *A63F 13/212* (2014.09); *G06T 15/04* (2013.01);
(Continued)

(58) Field of Classification Search
None
See application file for complete search history.

(56) References Cited

U.S. PATENT DOCUMENTS 6,084,979 A    7/2000 Kanade et al.
6,208,348 B1   3/2001 Kaye
(Continued)

FOREIGN PATENT DOCUMENTS

EP          2568355 A2      3/2013
NL     WO 2011058492 A1 *  5/2011  ......... H04N 13/0048
(Continued)

OTHER PUBLICATIONS

Izadi, Shahram, et al. "KinectFusion: real-time 30 reconstruction and interaction using a moving depth camera." Proceedings of the 24th annual ACM symposium on User interface software and technology. ACM, 2011.
(Continued)

Primary Examiner — Sultana M Zalalee
(74) Attorney, Agent, or Firm — Lerner, David, Littenberg, Krumholz & Mentlik, LLP

(57) ABSTRACT

A method of rendering an image based upon a first stereoscopic image comprising a pair of images is provided. The method includes generating a virtual three-dimensional model of the scene depicted in the first stereoscopic image responsive to distances derived from the first stereoscopic image, detecting one or more free edges in the three dimensional model, and generating one or more textures for the virtual three-dimensional model from at least one of the pair of images of the first stereoscopic image. The method also includes applying at least one texture to a respective part of the three dimensional model, and rendering the virtual three dimensional model from a different viewpoint to that of the first stereoscopic image. Rendering the virtual three dimensional model comprises modifying a transparency of rendered pixels of an applied texture as a function of the pixel's distance from that free edge.

13 Claims, 8 Drawing Sheets

(51) Int. Cl.

| | | |
|---|---|---|
| *G06T 15/04* | (2011.01) | |
| *H04N 13/02* | (2006.01) | |
| *H04N 13/00* | (2006.01) | |
| *G06T 17/20* | (2006.01) | |
| *G06T 19/00* | (2011.01) | |
| *A63F 13/40* | (2014.01) | |
| *A63F 13/212* | (2014.01) | |

(52) U.S. Cl.
CPC ............... *G06T 17/00* (2013.01); *G06T 17/20* (2013.01); *G06T 19/006* (2013.01); *H04N 13/0022* (2013.01); *H04N 13/0271* (2013.01); *H04N 13/0278* (2013.01); *A63F 2300/69* (2013.01); *A63F 2300/695* (2013.01); *H04N 2013/0081* (2013.01)

(56) References Cited

U.S. PATENT DOCUMENTS

| | | |
|---|---|---|
| 6,658,136 B1 | 12/2003 | Brumitt |
| 7,221,366 B2 | 5/2007 | Uyttendaele et al. |
| 8,704,879 B1 | 4/2014 | Cheng et al. |
| 8,797,321 B1 | 8/2014 | Bertolami et al. |
| 2002/0163519 A1 | 11/2002 | Kitsutaka |
| 2004/0156631 A1 | 8/2004 | Redert et al. |
| 2006/0119599 A1 | 6/2006 | Woodbury |
| 2007/0296721 A1 | 12/2007 | Chang et al. |
| 2009/0116732 A1 | 5/2009 | Zhou et al. |
| 2009/0177454 A1* | 7/2009 | Bronstein ............... G06T 17/20 703/11 |
| 2009/0244309 A1 | 10/2009 | Maison et al. |
| 2010/0134495 A1 | 6/2010 | Matsui |
| 2010/0162092 A1 | 6/2010 | Albu et al. |
| 2011/0074778 A1 | 3/2011 | Turner et al. |
| 2011/0080463 A1 | 4/2011 | Endo et al. |
| 2011/0122131 A1 | 5/2011 | Bruls et al. |
| 2011/0141319 A1 | 6/2011 | Watazawa |
| 2011/0254841 A1 | 10/2011 | Lim et al. |
| 2012/0075638 A1* | 3/2012 | Rollins ............... A61B 1/00009 356/479 |
| 2012/0139906 A1 | 6/2012 | Zhang et al. |
| 2012/0148147 A1 | 6/2012 | Ogata et al. |
| 2012/0162372 A1 | 6/2012 | Ghyme |
| 2012/0235988 A1* | 9/2012 | Karafin ............... H04N 13/026 345/419 |
| 2013/0050187 A1 | 2/2013 | Korcsok et al. |
| 2013/0071009 A1 | 3/2013 | Ha |

FOREIGN PATENT DOCUMENTS

| | | |
|---|---|---|
| WO | 2008026141 A2 | 3/2008 |
| WO | 2012084277 A1 | 6/2012 |

OTHER PUBLICATIONS

Yu, Yizhou, et al. "Mesh editing with poisson-based gradient field manipulation." ACM Transactions on Graphics (TOG) 23.3 (2004): 644-651.

Loscos, Celine, George Drettakis, and Luc Robert. "Interactive virtual relighting of real scenes." Visualization and Computer Graphics, IEEE Transactions on 6.4 (2000): 289-305.

Beymer D et al: "Eye gaze tracking using an active stereo head", Proceedings / 2003 IEEE Computer Society Conference on Computer Vision and Pattern Recognition, 18 ? Jun. 20, 2003, Madison, Wisconsin; [Proceedings of the IEEE Computer Conference on Computer Vision and Pattern Recognition], Los Alamitos, Calif. [U.A, vol. 2, Jun. 18, 2003, pp. 451?458, XP01064470.

Exendend European Search Report for Application No. 13189699.5 dated Jan. 30, 2014.

Extended European Search Report for Application No. 13189707.6 dated Feb. 5, 2014.

Hoppe H: "Progressive Meshes", Computer Graphics Proceedings, SIGGRAPH 196, ACM, New York, US, Jan. 1, 1996 (Jan. 1, 1996), pp. 100-102, XP008107612.

PlayStation: "EyePet Move E3 Trailer", you tube, Jun. 14, 2010, XP054975297, Retrieved from the Internet: URL: http://www.youtube.com/watch?v=TztCY2iz450, retrieved on Jan. 21, 2014.

Sugita K: "VR Object Composition Method Using Stereo Vision", Advanced Information Networking and Applications, 2006. AINA 2006. 20th International Conference on Vienna, Austria Apr. 18-20, 2006, Piscataway, NJ, USA, IEEE, vol. 2, Apr. 18, 2006, pp. 683-687, XP010915442.

Sung-Yeol Kim: "Depth Map Creation and Mesh-based Hierarchical 3-D Scene Representation in Hybrid Camera System", 2008, Department of Informatiom and Communications School of Information and Mechatronics, Gwangju Institute of Science and Technology, XP002719287, pp. 1-137.

Waschbusch et al: "Point-sampled 3D video of real-world scenes", 9-13 Signal Processing. Image Communication, Elsevier Science Publishers, Amsterdam, NL, vol. 22, No. 2, Mar. 16, 2007, pp. 203-216, XP005938669.

British Seach and Examination Report for Application No. 1303315.5 dated Aug. 16, 2013.

British Search and Examination Report for Application No. GB1303299 dated Aug. 27, 2013.

British Search and Examination Report for Application No. GB1303301.4 dated Aug. 9, 2013.

British Search and Exmaination Report for Application No. GB 1220219 dated May 1, 2013.

Ju, Xiangyang, et al. "Integration of range images in a multi-view stereo system." Pattern Recognition, 2004. ICPR 2004. Proceedings of the 17th International Conference on. vol. 4. IEEE, 2004.

David E. Breen, Eric Rose, and Ross T. Whitaker, Interactive Occlusion and Collision of Real and Virtual Objects in Augmented Reality, European Computer-Industry Research Centre, 1995.

UK Examination Report, dated Aug. 5, 2016.

\* cited by examiner

US 9,529,427 B2

SYSTEM AND METHOD OF IMAGE RENDERING

CROSS REFERENCE TO RELATED APPLICATIONS

The present application claims the benefit of and priority to GB Application No. 1220219.8, filed Nov. 9, 2012, and GB Application No. 1303305.5, filed Feb. 25, 2013, the entire disclosures of which are incorporated by reference herein.

BACKGROUND OF THE INVENTION

Field of the Invention

The present invention elates to a system and method of image rendering.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Many videogame consoles now have the option to use video cameras as a form of input, such as the PlayStation Eye® and the Microsoft Kinect®. Meanwhile, some consoles now also have the facility to generate 3D outputs for use with 3D televisions. It would be preferable if these 3D enabled consoles could also use 3D video inputs of the player, from a stereoscopic camera.

In addition to providing stereo images that may be optionally integrated into a 3D videogame display, the coupling of a stereoscopic camera to a videogame console also provides additional information about the user's environment that may be of use for such integration or may provide information or constraints relevant to a videogame or other form or augmented reality entertainment.

For example, by estimating the positions of the walls in a user's room, virtual objects in the display can be made to act in a manner consistent with the extent of that room and with the user themselves, and/or the actions required by the user to play the game can be anticipated and the game adjusted, to ensure that the player is not required to move through a wall or item of furniture to achieve a goal.

In addition to images of a user captured by a video camera, such techniques may also be applied to pre-recorded images.

In either case however, it will be important for the modifications or augmentations of the source material to look natural and preferably seamless.

The present invention seeks to address or mitigate this need.

SUMMARY OF THE INVENTION

In a first aspect, a method of rendering an image is provided in accordance with claim 1.

In another aspect, an entertainment device for rendering an image is provided in accordance with claim 10.

Further respective aspects and features of the invention are defined in the appended claims.

It is to be understood that both the foregoing general description of the invention and the following detailed description are exemplary, but are not restrictive, of the invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

A system and method of image rendering are disclosed. In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

Figure 1:
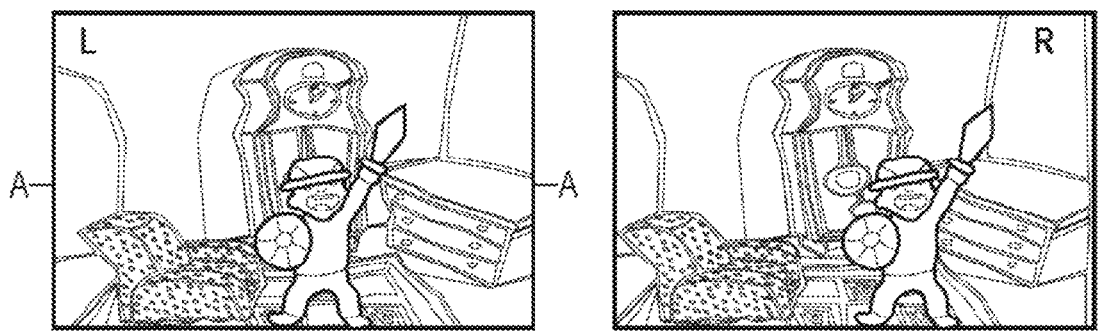
FIG. 1 is a schematic diagram of a stereoscopic pair of images.

Referring now to FIG. 1, this shows an example stereoscopic pair of images such as may be captured by a 3D video camera attached to a console. In the left and right images (denoted R and L in the figure), a child is performing actions in their living room in response to a video game, and in each image a different viewpoint on the scene is captured.

However, it will be appreciated that a small area of the room behind the child is not seen in either image, and similarly there are sections of the room behind the chair that are obscured. In order to potentially digitally recreate the room (for example to insert monsters to battle, or to rotate the room on screen to reveal treasure, or to apparently bounce virtual objects on walls and/or furniture in the room, or to appropriately calculate the effects of a virtual light source on the captured video), it would be desirable to fill in the missing areas within a digital model of the room.

Hence in an embodiment of the present invention, as a preparatory step the left and right images can be rectified to line up vertically.

Next, a disparity map is generated, using one of several known techniques. A disparity map indicates the horizontal disparity between corresponding pixels in each image. Most techniques rely on some form of localised cross-correlation between regions of the two images, but any suitable technique may be used.

The disparity map is an indirect indicator of distance between the 3D video camera and a surface depicted in the image. For a pair of parallel aligned video cameras in a 3D video camera, it will be appreciated that the parallel lines converge at infinity and so at that distance there would be no disparity. Meanwhile an object very close to the cameras would show significant horizontal disparity. Hence the degree of disparity corresponds to the distance of the pixel from the camera.

Meanwhile, a small object very close to the cameras may in fact not properly appear in both images, and so the stereo disparity also effectively imposes an operational near-distance limit on the stereoscopic effect.

However, for objects within the operational region of the device, the disparity between these objects in the two images can be related to their relative depth from the camera.

To generate a digital model of the scene one may calculate the depth information or 'z' value at each x, y point in the disparity map to create a notional point-cloud of (x,y) positions with associated 'z' value data, and then define a mesh describing the room by, for example, Delaunay triangulation of the calculated (x,y) points or a subsample thereof. This mesh can then be projected into 3D by adding the associated 'z' value to the mesh.

Optionally, the disparity map can be pre-processed to improve the fidelity of the mesh. Firstly, disparity data for successive video frames can be stored, and disparity values that are inconsistent between frames can be replaced. For example, if a patch of a wall appears to have a different disparity in only one frame due to an autocorrelation error (for example because a shadow on the wall resembles a different feature of the other image in the stereo pair) then this can be identified and corrected using disparity values from one or more previous maps.

Similarly optionally, inconsistencies in disparity may be isolated by using different block sizes (e.g. windows for autocorrelation detection) to derive disparity maps and identifying inconsistencies between these versions of the map to produce a map with higher confidence disparity values.

Similarly optionally, an edge detection algorithm can be used to cross-validate where disparity values should be expected to change in the images.

Similarly optionally, a point-by-point disparity check can be implemented, for example by using a 3×3 pixel test window on the disparity map, and calculating whether the central pixel disparity is different by more than a predetermined amount; and if so, that pixel disparity is replace, for example with the average of the disparity of the other eight pixels in the test window (or some other local disparity value).

Other optional refinements to the process of making the initial mesh relate to the selection of (x,y) points in the image to use for triangulation.

To provide a sampling of points of reasonable density in the image, optionally at least one point is sampled in each P×Q block of pixels, where P and Q are predetermined dimensions (for example, and 8×8 block of pixels, and is stored with an associated disparity value. The point may be selected from either image of the stereo pair or alternatively from a processed version of one image (or from both if combined). Optionally, more points are sampled within a block where there is an apparent edge in either colour or disparity values, in order to make the resulting mesh more faithfully track the structural elements of the scene likely to correspond with such colour and/or disparity edges. The edge itself may be determined first to satisfy a consistency criterion, for example having a predetermined minimum length, and/or gradient of change in colour or disparity.

Thus optional filters have been provided to remove inconsistencies in the disparity map, and to select salient (x,y) points for triangulation (for example Delaunay triangulation) to create a 2D mesh with associated disparity or depth values.

This 2D mesh can then be easily projected into 3D by giving the vertices of the 2D mesh the depth values associated with the points.

It will be appreciated that in principle the (x,y) points and z values can be used to generate a 3D mesh in one step. However, by optionally having a 2D mesh and exactly corresponding 3D mesh, it is simple to cross reference the 3D mesh with the 2D mesh to calculate the distance between pixels in the image space that the 3D model will replicate.

As will be noted below, polygons comprising small differences in (x,y) distances but proportionately large differences in z distance are indicative of meshing errors and can be removed, as explained later herein.

Figure 2:
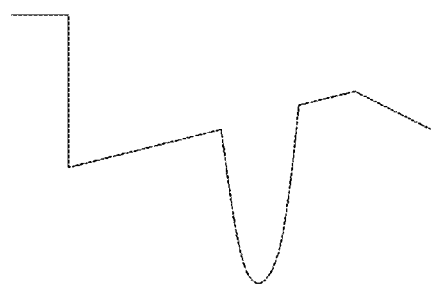
FIG. 2 is a schematic plan view of a portion of a mesh generated from the stereoscopic pair of images.

Hence returning now to FIG. 1 and now also FIG. 2, then using the line A-A in FIG. 1 as an example, then FIG. 2 illustrates a plan view of a slice through a mesh at a corresponding line in the digital model. FIG. 2 is shown aligned with one of the images from FIG. 1 for ease of understanding. It can be seen that the depth of the mesh on the left side is effectively infinite (or at a maximum depth), corresponding to the doorway out of the room. The mesh then generally maps along the wall. However, there is a clear error where the images show the child. As noted above, the problem is that a simple triangulation of the points in the disparity map can create a mesh that incorrectly treats isolated near-field objects as solid projections from the background. Hence in FIG. 2, the (x,y,z) points corresponding to the child's head are interpreted as a projection forwards from the adjacent (x,y,z) points corresponding to the wall of the room. This is clearly wrong.

To address this, in an embodiment of the present invention, the generation of such a mesh is performed in a plurality of N stages or layers. These layers are defined as follows.

The minimum disparity in the image, corresponding to the furthest distance, is denoted dispMin.

The maximum disparity (or the maximum valid disparity, if a cut-off is being applied) is denoted dispMax.

Then, $\text{dispPerLayer} = (\text{dispMax} - \text{DispMin})/N$.

dispPerLayer defines a disparity range for successive analysis layers of the disparity map. Hence a first layer encompasses a start point dispMin to an end point (dispMin+dispPerLayer)−1, and a second layer encompasses a start point (dispMin+dispPerLayer) to an end point (dispMin+(2×dispPerLayer)−1), and so on. In this embodiment, the layers simply adjoin and do not overlap, or only overlap in the sense of starting or terminating at the same depth as the adjacent layer. Both interpretations are treated as 'non-overlapping' herein.

It will be appreciated that since there is typically a non-linear relationship between disparity and physical distance, then similarly the calculated distance may be divided equally by N, and the corresponding disparity ranges identified for each of the resulting N layers.

In either case however, it will be understood that each successive layer represents a slice of the disparity map in the z-axis having thickness dispPerLayer, progressing from the most distant elements in the map forwards.

Figure 3A:
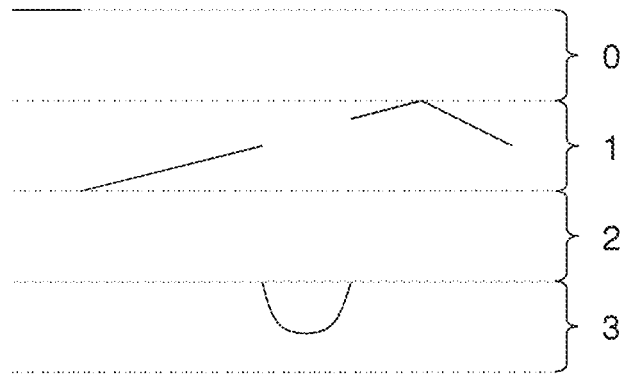
FIGS. 3A to 3C are schematic plan views of a sequence of meshes generated from the stereoscopic pair of images in accordance with an embodiment of the present invention.
Figure 3B:
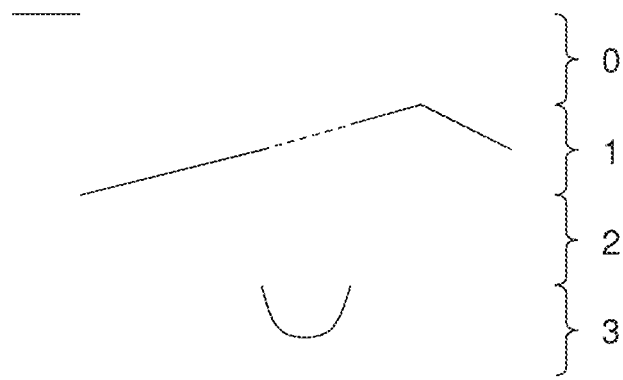
Figure 3C:
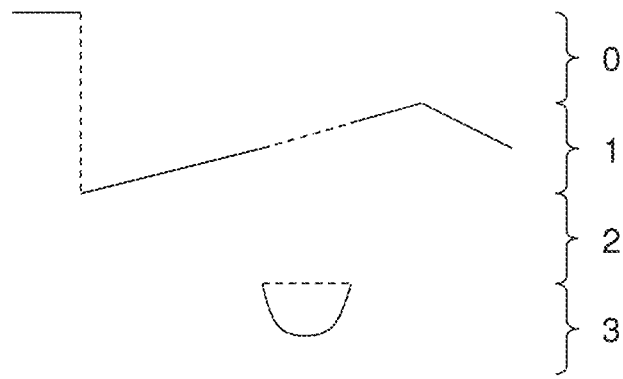

Referring now to FIGS. 3A to 3C, these illustrate a mesh generation process with (as a non-limiting example) 4 such layers, labeled 0 to 3 in FIG. 3A.

Starting with layer 0, only the disparity or depth values within the range of this layer are considered. For processing efficiency, this may be achieved by copying only the points of the disparity map within this range to a temporary disparity map, which is then subject to a 2D/3D meshing process such as the Delaunay triangulation process referred to above. In this case the remaining points in the temporary disparity map are treated as invalid or empty points as appropriate. It will be appreciated that any of the optional filtering processes previously described can be applied to the points of the image as a whole, or on a layer-by-layer basis, as appropriate.

Hence in layer 0, only the depth information corresponding to the doorway in the scene of FIG. 1 is present. A mesh based on these actual (x,y,z) points (shown with a solid line in FIG. 3B) is created for layer 0.

Next, for layer 1, a mesh based on the actual (x,y,z) points is shown with a solid line in FIG. 3B. Notably, due to the layering process described above, the mesh for this layer is generated as if the child was not in the room at all. Consequently the region of (x,y,z) points missing due to their occlusion by the child in the captured stereo image are interpolated in a manner consistent with the actual (x,y,z) points in this layer, and may be treated automatically by a Delaunay algorithm as a region of the point cloud with sparse samples. The interpolated section of the mesh is shown in FIG. 3B with dotted lines.

In this example layer 2 does not encompass any disparity values.

For layer 3, again a mesh based on the actual (x,y,z) points in this layer is generated. In this case, these correspond to the foreground object, which is the child.

The resulting meshes are then merged to form a single composite digital model of the scene.

Several optional rules may be implemented at this point to provide a good overall result, including one or more selected from the list consisting of:

Firstly, where the meshes of two layers terminate but have terminal x, y and z positions within a threshold distance of each other, then these meshes may be joined. Optionally for layers 0 and 1 the restriction on the z position may be relaxed, since layer 0 may reach to infinity. Hence for example the mesh of layer 0 may still be joined to the mesh of layer 1, as shown by the dotted line in FIG. 3C, because they have adjoining x, y values.

Secondly, where two meshes overlap, duplicate polygons at the same positions (or within a predetermined tolerance) are deleted.

Thirdly, as noted above, where a polygon in a mesh covers a small distance in the x,y plane, but a large distance along the z axis (as defined by predetermined absolute or relative thresholds) then that polygon may be deleted. Put another way, polygons in a layer mesh having a predetermined angle close to the normal to the image plane, or similarly, close to parallel to the line of sight of the camera, may be removed.

Fourthly, where the meshes of two layers occupy similar x, y positions but not similar z positions as defined by a predetermined threshold, then it can be assumed that the meshes represent discrete objects, as in the child of layer 3 and the wall of layer 1 in the present example. In this case, the foreground mesh may optionally be closed (represented by the dotted line on the mesh corresponding to the child in FIG. 3C).

In a similar manner to the optional point selection described previously, optionally other discriminators may be used to improve foreground and background segmentation of this kind, including but not limited to colour segmentation. For example, if a first colour is associated with the background polygons, but not with foreground polygons (and/or vice versa), then for (x,y) positions close to the edge of the foreground object, the associated colours can be used to refine the meshes to more closely segregate the foreground object.

Finally, during creation of the mesh at each layer, optionally a rule may be implemented to suppress interpolation of the mesh for points more than a predetermined distance apart, where the distance is a function of the layer number. Optionally this rule may only be enacted after a predetermined proportion of layers have been meshed, such as 50% or 75%. The purpose of this rule is to prevent or reduce erroneous interpolation of a mesh between two people standing in the same foreground layer.

It will be appreciated that typically the object(s) causing the most relevant occlusions will be the one or more people interacting with the console. Consequently for example the console may use face recognition to identify a plurality of users in the images and their corresponding depth positions in the disparity map, and select N or modify the layer ranges to ensure that they are meshed in a separate layer from the background and preferably also from each other. More generally, the console may select a value of N responsive to the maximum distance or minimum disparity value so that each layer is of a thickness (or has a point population) sufficient to build a reasonable mesh. In general, the higher the value of N (i.e. the more layers used), the better the end result.

Where two people are in the same layer, recognition that they are people can also be used to constrain mesh generation, treating them as a special case and possibly using different mesh generation rules based upon for example skeletal modeling. Interpolation between identified people can also therefore be suppressed in this way.

It will be appreciated that the layers in the embodiment described above are non-overlapping. However, referring now to FIGS. 4A to 4C, in an alternative embodiment the layers are defined as follows; the first layer 0' encompasses start point dispMin to end point (dispMin+dispPerLayer), the second layer 1' encompasses start point dispMin to end point (dispMin+(2×dispPerLayer)), and the third layer 2' encompasses start point dispMin to end point (dispMin+(3×dispPerLayer)), and so on. That is to say, the layers overlap, and starting at the furthest distance they get progressively deeper to encompass more of the disparity map each time. In the example above where N=4, then the final layer 3' encompassing start point dispMin to end point (dispMin+(4×dispPerLayer)) includes all the points in the disparity map, like the conventional mesh described previously and illustrated in FIG. 2. The individual meshes can follow similar rules to those described in the previous embodiment, such as suppressing interpolation for high disparity points, refining meshes using colour information, and/or limiting interpolation (or using different meshing techniques) for identified people in the images. They can also use the above described optional filters and foreground separations strategies.

Figure 4A:
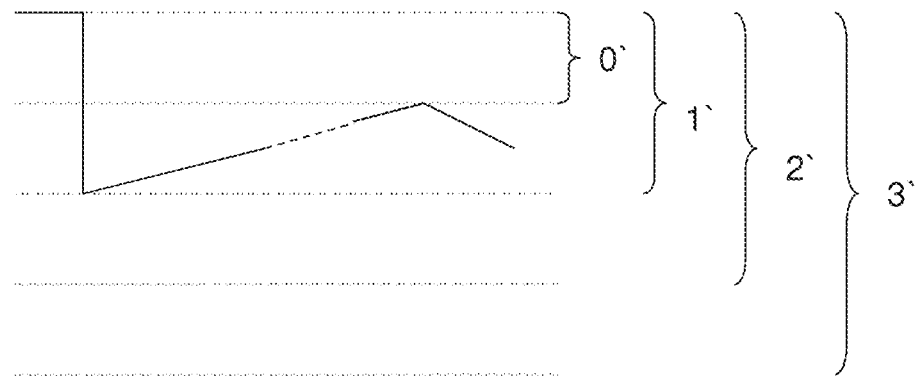
FIGS. 4A to 4C are schematic plan views of a sequence of meshes generated from the stereoscopic pair of images in accordance with an embodiment of the present invention.
Figure 4B:
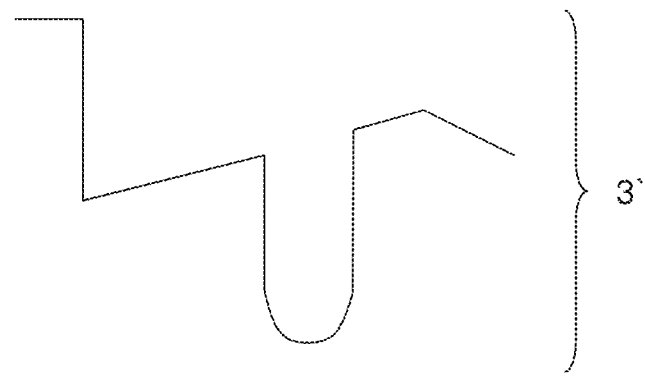

FIG. 4A illustrates the mesh generated for layer 1'. FIG. 4B illustrates the mesh generated for layer 3'.

As in the previous embodiment, the meshes are merged successively. Hence the mesh of layer 1' is merged with the mesh of layer 0' to generate a first merged mesh. Then the mesh of layer 2' is merged with the first merged mesh to generate a second merged mesh. Then the mesh of layer 3' is merged with the second merged mesh to generate a third merged mesh. This process can be implemented as new layer meshes are generated, or once all layer meshes have been generated.

Again, during the merging process duplicate polygons from different meshes that substantially overlap are deleted, preferably preserving the polygon generated in the mesh of the thinner (earlier) layer. Again, where a polygon in a mesh covers a small distance in the x,y plane, but a large distance on the z-axis (as defined by predetermined thresholds) then that polygon is deleted, in other words where the polygon is, within a predetermined tolerance, on the z-plane, or parallel to the line of sight of the cameras, or substantially normal to the image plane, then it is deleted. This latter step for example effectively removes the connection between foreground objects and background objects in the meshes of the thicker layers.

Figure 4C:
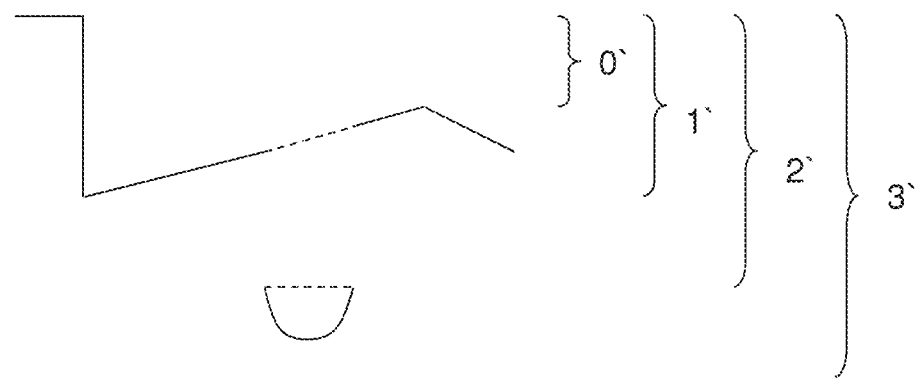

FIG. 4C illustrates the merged meshes in the present example. Here, the left-most section of the mesh corresponds to the mesh generated for layer 0', which was overlapped by each successive mesh and so the duplicate polygons were deleted. The section of the mesh corresponding to the wall was generated for layer 1', with the interpolated section of the mesh for the wall shown as a dotted line. The duplicate polygons for the wall also generated for layers 2' and 3' would have been deleted. Finally, the mesh for the child was generated for layer 3'. It will be appreciated that, as noted previously, the mesh for the child does not overlap that of the wall; whilst it has similar x,y co-ordinates to a section of the wall, it has different z co-ordinates and hence does not overlap in 3 dimensions. Meanwhile the polygons that were nearly normal to the image plane (having a small x-y distance and a large z distance) have been deleted, separating the child from the wall. As in the previous embodiment, optionally the mesh corresponding to the child has been closed, denoted by the dotted line on the part of the mesh corresponding to the child.

Hence the present invention may operate using a series of either overlapping or non-overlapping layers, successively moving forward along the z axis. The overall resulting 3D model is similar using either embodiment. For non-overlapping layers, logic relating to linking meshes for surfaces that pass through the layer interfaces may have more significance, whilst for overlapping layers, logic relating to identifying and deleting duplicate polygons may have more significance.

For the meshes from either embodiment, finally an optional mesh filter may be employed as follows. In a first step the entertainment device compares neighbouring polygons to determine if they are substantially on the same plane. For example if 3 polygons sharing a vertex point lie within a predetermined angle of each other (for example ±1, 2, 4 or 6 degrees, depending on designer choice) then these polygons can be modified to lie on a plane derived from the average of each of the polygon's individual planes. Optionally several passes through the mesh may be performed in this manner to homogenise the planar orientation of polygons that are initially only roughly co-planar.

The purpose of this filtration is to make the surface smoother and also to make the local normals on the surface more consistent and closer to that expected by the user, so that light and/or virtual objects can be made to bounce off that surface in a more realistic and expected manner.

Alternatively or in addition, patch based plane detection (or RANSAC or another plane detection algorithm) is applied to a relatively large set of vertices (for example, vertices corresponding to a region of colour in the corresponding image) and calculates the overall plane. These vertices are then updated to lie on the plane, thereby removing any bumps in the majority of that surface.

Figure 5A:
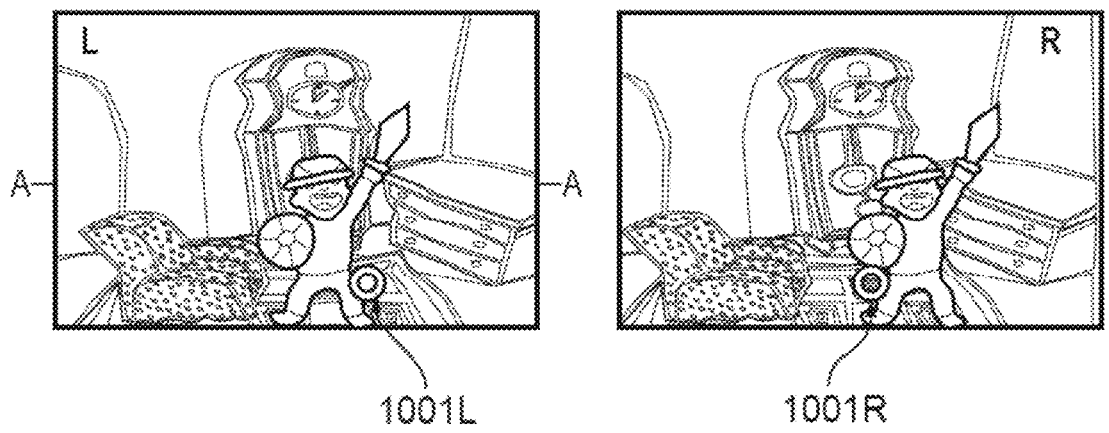
FIG. 5A is a schematic diagram of a stereoscopic pair of images, indicating colour samples.
Figure 5B:
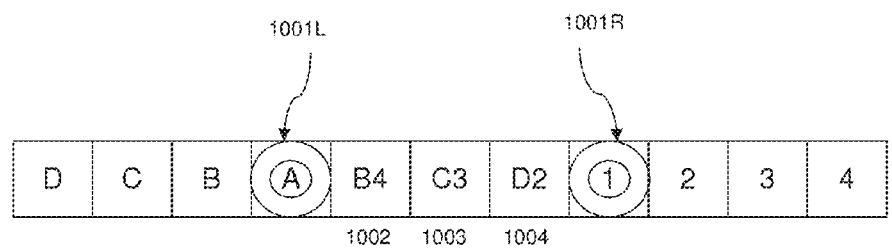
FIG. 5B is a schematic diagram of a texture to be interpolated in accordance with an embodiment of the present invention.

Turning now to FIGS. 5A and 5B, in addition to the generation of the mesh for the digital model of the scene, in embodiments of the present invention it is also desirable to generate textures to apply to the mesh.

It will be appreciated that for regions of the mesh corresponding to visible elements of one or both of the stereo images, the texture can be derived from one or both images.

An efficient way to do this involves treating the generated 3D model as being flat (i.e. ignore depth values) such that it functions as mosaic joining together the selected points from the image. The textures of the image for each visible polygon then correspond to the pixels within the corresponding piece of mosaic.

However, it is also desirable to generate textures for those parts of the mesh occluded from view in the original images, so that these parts of the model are visible if the viewpoint is modified by the user.

Referring to FIG. 5A, by way of example, the circled points in the figure show different sections of a carpet or rug. In a colour rendition of the image, the point 1001L is a salmon pink, whilst 1001R is a beige and green mix. However, the interface between these two sections of the rug is obscured by the child in both images.

Consequently, texture interpolation between two points 1001L and 1001R may be optionally performed for the corresponding section of the mesh model as follows.

In FIG. 5B, the two pixel positions 1001L and 1001R have colour values labelled 'A' and '1' respectively, denoting the arbitrary colour values at those positions in the current images. In the texture to be applied to the mesh, three intervening pixels 1002, 1003, 1004 are undefined.

To interpolate the colour values of these pixels, in an embodiment of the present invention the colour values 'A' and '1' corresponding to positions 1001L and 1001R are not used.

Instead, colour values of neighbouring pixels positioned away from the undefined pixels are used.

This is because in the image, the missing pixels are obscured by an unrelated foreground object (the child) and for the pixels immediately adjacent to this object in the images there is a significant risk that the pixel colour at positions 1001L and 1001R is in fact already a combination of the colour of the foreground and background objects, due to the per-pixel colour sampling in the CCDs of the video camera source. Rather than propagate this tainted colour across the undefined pixels, it is assumed that neighbouring pixels further from the foreground object may be more representative of the true background colour.

Hence in an embodiment of the present invention, the three interpolated pixels may therefore take the following values:

1002—75% 'B', 25% '2'
1003—50% 'B', 50% '2'
1004—25% 'B', 75% '2'.

This provides a uniform transition between the colours 'B' and '2' sampled one pixel adjacent to positions 1001L and R.

Alternatively, successively distant neighbouring pixels may be used. The purpose of this is to preserve the existing variability of the texture as well as to blend the colours. In a transient image, this will make the interpolation less obvious as the spatial frequencies in the interpolated section will now be similar to those in the surrounding texture.

Hence in this embodiment, the three interpolated pixels may take the following values:

1002—75% 'B', 25% '4'
1003—50% 'C', 50% '3'
1004—25% 'D', 75% '2'.

The polygon mesh and the texture(s) may then be rendered and displayed on screen. For the same viewpoint as the original camera, the resulting render is likely to look nearly identical to the original image, as only mesh based on actual (x,y,z) points and texture from visible image data will be used. However, as the virtual viewpoint is moved, for example as part of a game play mechanic, or in response to head tracking of a viewer, then elements of the scene that have been interpolated become visible.

Thus more generally, such texture gaps are filled in with local texture data on a scan-line basis, with the texture on either side of the gap being mirrored into the gap.

Optionally where the still image or video was taken using a camera equipped with a suitable accelerometer and/or gyroscope or set of accelerometers and/or gyroscopes, then the angle of the photo with respect to horizontal can be obtained, and this can be used to adjust the effective scan line used in the gap filling process. Hence for example if the gap to be filled was 50 pixels long, and accelerometer data suggested that the camera was at an angle of 3 degrees to the horizontal, then the gap filling algorithm may approximate a scan line spanning approximately 50×Sin (3) lines of pixels in the captured image. If not accelerometer data exists, then optionally an effective scanline may be chosen to run parallel to a nearby edge in the image that is close to horizontal.

In an embodiment of the present invention, the mesh and textures (i.e. the 3D model) generated as described above or by another suitable method is persistent, and retained from frame to frame of the captured video.

In this 3D model, background objects can be measured or assumed to be stationary; for example an object that (for its distance) is a threshold amount P larger than a person where P is a predetermined proportion such 1.5 or 2, and/or which has a flat surface, and/or does not move over Q successive video frames, where Q is a predetermined number such as 30 or 90, can be assumed to be part of the background and assumed to be stationary.

It will be appreciated that if a background object is partially occluded by a person, then when that person moves, the portion of the background object that is revealed can be added to the model, both in terms of confirmed mesh geometry and confirmed texture.

Confirmed mesh and texture values can then be used to improve the interpolation of the model behind where the user is currently stood as they move around.

Where foreground objects are static (for example a desk) and obscure a background object (for example a wall or carpet) then the model can extrapolate the wall/floor surfaces and associated textures.

Notably, whilst (assuming a fixed camera position) these extrapolated surfaces may never be seen directly they can affect the result of placing a virtual light source in the model, or may be used to constrain or interact with virtual objects such as pets, or bouncing balls.

Figure 6:
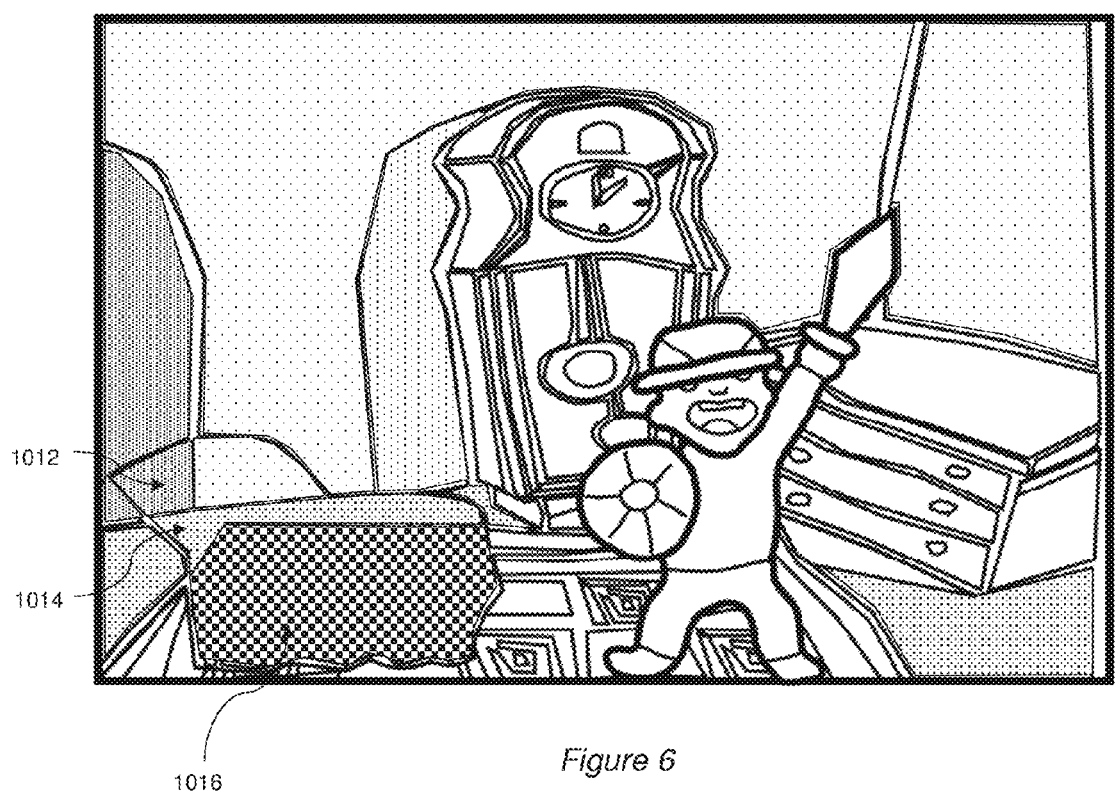
FIG. 6 is a schematic diagram of an extrapolation of surfaces in a model generated from the stereoscopic pair of images, in accordance with an embodiment of the present invention.

Referring to FIG. 6, for example, the chair in the room permanently obscures parts of the wall, the doorway, the floor and the rug. The meshes defining these surfaces behind the chair can be extrapolated until they meet, and the colour components of the surfaces can be similarly extrapolated, either with uniform colours (1012, 1014) or using colour combinations or repeated textures (1016), for example in a similar manner to that described with reference to FIG. 5B. In this case, the wall is blue, the floor is a khaki colour and the rug is a mix of beige and terracotta.

It will be appreciated therefore that if a virtual white light source was positioned in the 3D model between the chair and the wall, whilst the light source itself would be obscured by the chair, the reflected light would (in this example) have a blue/green tint. This light would affect the colour of the other objects in the 3D model if the model was rendered.

The model of the chair may also cast a shadow from the virtual light that plays over part of the model of the user.

Consequently, the model of the scene can be realistically lit using virtual light sources.

In a similar way, a ball whose trajectory took it behind the chair would bounce off the unseen floor and/or wall in a realistic manner and re-emerge in a direction intuitively expected by the user.

In an embodiment of the present invention, the rendered model is displayed instead of augmenting the original stereo video or stereo photo. This is particularly the case when the user changes the desired viewpoint of the image from that of the original image.

However, in an embodiment of the present invention, the original stereo video or stereo photo is augmented using the rendered model as follows. When an augmentation of the original image comprises the addition of a virtual light source, this light source is added or applied to the 3D model as described above. The model is then rendered (but not displayed) with this light source at the same viewpoint as the video camera, to calculate how the light source and its reflections, shadows etc. modify the rendered textures. These modifications to the rendered textures (i.e. the colour difference with and without the light source) thereby generate a red/green/blue colour change map of the effect of the virtual light source on the scene.

These red/green/blue colour changes can then be applied to the original captured video. In this way, the effects of the virtual light on the virtual model of the scene can be applied to the real video of the scene for the corresponding video frame, thus seeming to apply a virtual light source to the original video. For 3D video, the rendering, colour change mapping and augmentation can be done for each of the left and right viewpoints.

It will be appreciated therefore that as appropriate the above described techniques enable a variety of applications.

In an embodiment of the present invention, a virtual light source (or a virtual object comprising a lightsource) may be made to apparently move within a stereoscopic photo or video, and cast plausible shadows of objects in the scene onto other objects. The colour of the light source can be seen to affect the scene, and colours in the scene may affect how reflected light affects other elements of the scene.

This may be implemented on a render of the model of the scene, or the effects of the virtual light on the model may be transposed to the original photo or video frame to augment it.

Alternatively or in addition, virtual objects can interact with the model of the scene. This may take the form of the model acting as a bounding box for virtual objects and characters, and/or the surfaces of the model providing surfaces for physics/based interactions, such as bounding a ball against a wall, or dropping a ball onto a table and having it bounce off and onto the floor. Where an element of the scene is mobile (i.e. the user) then motion data can be accumulated and used in such physics based interactions, for example giving or adding a new velocity to a ball (i.e. hitting it in a new direction).

Again, such interactions may be implemented on a render of the model of the scene, or the virtual objects, as computed to interact with the model of the scene, may be rendered appropriately and then used to augment the original photo or video frame.

Alternatively or in addition, head tracking of a user may be employed to detect their current viewpoint with respect to the displayed image. If this viewpoint is different to that of the camera that caught the image (or differs by a threshold amount), then the rendered model of the image is displayed from the user's detected viewpoint. The subjective effect is therefore that the user can move their head left, right, up or down and apparently see the picture be recomposed as if it were a real 3D object on the other side of the display screen.

A suitable device for carrying out the techniques and variants herein under suitable software instruction include but are not limited to the Sony® PlayStation 3® and PS Vita®. Hence for example other devices may include set-top television boxes for terrestrial, satellite and/or cable broadcast TV, set-top boxes for IPTV, PCs and other media consumption devices with suitable processing power, and Blu-Ray® players.

Figure 7:
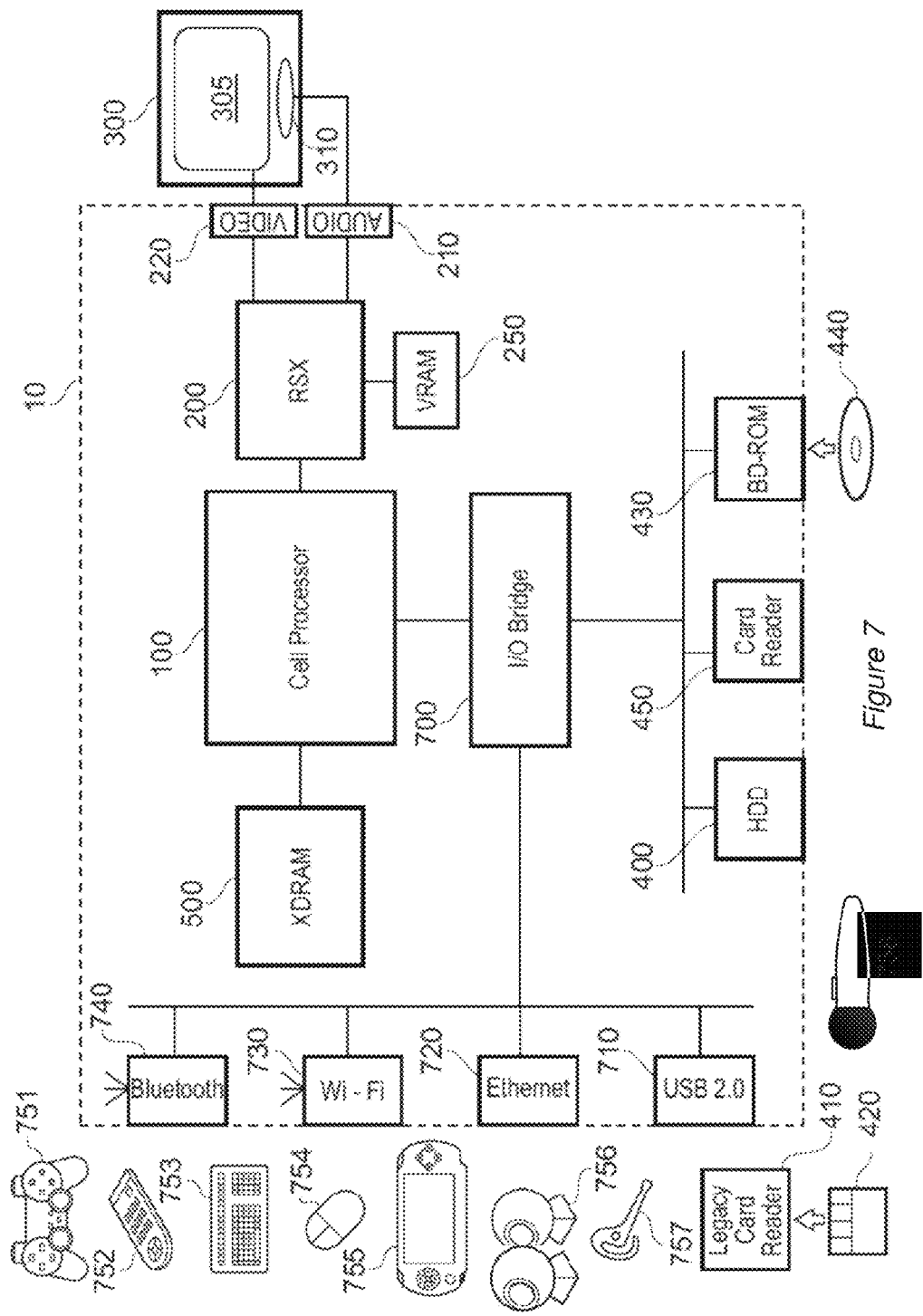
FIG. 7 is a schematic diagram of an entertainment device in accordance with an embodiment of the present invention.

By way of example, FIG. 7 schematically illustrates the overall system architecture of the Sony® Playstation 3® entertainment device. A system unit 10 is provided, with various peripheral devices connectable to the system unit.

The system unit 10 comprises: a Cell processor 100; a Rambus® dynamic random access memory (XDRAM) unit 500; a Reality Synthesiser graphics unit 200 with a dedicated video random access memory (VRAM) unit 250; and an I/O bridge 700.

The system unit 10 also comprises a Blu Ray® Disk BD-ROM® optical disk reader 430 for reading from a disk 440 and a removable slot-in hard disk drive (HDD) 400, accessible through the I/O bridge 700. Optionally the system unit also comprises a memory card reader 450 for reading compact flash memory cards, Memory Stick® memory cards and the like, which is similarly accessible through the I/O bridge 700.

The I/O bridge 700 also connects to four Universal Serial Bus (USB) 2.0 ports 710; a gigabit Ethernet port 720; an IEEE 802.11b/g wireless network (Wi-Fi) port 730; and a Bluetooth® wireless link port 740 capable of supporting up to seven Bluetooth connections.

In operation the I/O bridge 700 handles all wireless, USB and Ethernet data, including data from one or more game controllers 751. For example when a user is playing a game, the I/O bridge 700 receives data from the game controller 751 via a Bluetooth link and directs it to the Cell processor 100, which updates the current state of the game accordingly.

The wireless, USB and Ethernet ports also provide connectivity for other peripheral devices in addition to game controllers 751, such as: a remote control 752; a keyboard 753; a mouse 754; a portable entertainment device 755 such as a Sony Playstation Portable® entertainment device; a video camera such as a stereoscopic version of the PlayStation Eye® video camera 756; and a microphone headset 757. Such peripheral devices may therefore in principle be connected to the system unit 10 wirelessly; for example the portable entertainment device 755 may communicate via a Wi-Fi ad-hoc connection, whilst the microphone headset 757 may communicate via a Bluetooth link.

The provision of these interfaces means that the Playstation 3 device is also potentially compatible with other peripheral devices such as digital video recorders (DVRs), set-top boxes, digital cameras, portable media players, Voice over IP telephones, mobile telephones, printers and scanners.

In addition, a legacy memory card reader 410 may be connected to the system unit via a USB port 710, enabling the reading of memory cards 420 of the kind used by the Playstation® or Playstation 2® devices.

The game controller 751 is operable to communicate wirelessly with the system unit 10 via the Bluetooth link. However, the game controller 751 can instead be connected to a USB port, thereby also providing power by which to charge the battery of the game controller 751. In addition to one or more analog joysticks and conventional control buttons, the game controller is sensitive to motion in 6 degrees of freedom, corresponding to translation and rotation in each axis. Consequently gestures and movements by the user of the game controller may be translated as inputs to a game in addition to or instead of conventional button or joystick commands. Optionally, other wirelessly enabled peripheral devices such as the portable entertainment device 755 or the Playstation Move® 758 may be used as a controller. In the case of the portable entertainment device, additional game or control information (for example, control instructions or number of lives) may be provided on the screen of the device. In the case of the Playstation Move, control information may be provided both by internal motion sensors and by video monitoring of the light on the Playstation Move device. Other alternative or supplementary control devices may also be used, such as a dance mat (not shown), a light gun (not shown), a steering wheel and pedals (not shown) or bespoke controllers, such as a single or several large buttons for a rapid-response quiz game (also not shown).

The remote control 752 is also operable to communicate wirelessly with the system unit 10 via a Bluetooth link. The remote control 752 comprises controls suitable for the operation of the Blu Ray Disk BD-ROM reader 430 and for the navigation of disk content.

The Blu Ray Disk BD-ROM reader 430 is operable to read CD-ROMs compatible with the Playstation and PlayStation 2 devices, in addition to conventional pre-recorded and recordable CDs, and so-called Super Audio CDs. The reader 430 is also operable to read DVD-ROMs compatible with the Playstation 2 and PlayStation 3 devices, in addition to conventional pre-recorded and recordable DVDs. The reader 430 is further operable to read BD-ROMs compatible with the Playstation 3 device, as well as conventional pre-recorded and recordable Blu-Ray Disks.

The system unit 10 is operable to supply audio and video, either generated or decoded by the Playstation 3 device via the Reality Synthesiser graphics unit 200, through audio and video connectors to a display and sound output device 300 such as a monitor or television set having a display 305 and one or more loudspeakers 310. The audio connectors 210 may include conventional analogue and digital outputs whilst the video connectors 220 may variously include component video, S-video, composite video and one or more High Definition Multimedia Interface (HDMI) outputs. Consequently, video output may be in formats such as PAL or NTSC, or in 720p, 1080i or 1080p high definition.

Audio processing (generation, decoding and so on) is performed by the Cell processor 100. The Playstation 3 device's operating system supports Dolby® 5.1 surround sound, Dolby® Theatre Surround (DTS), and the decoding of 7.1 surround sound from Blu-Ray® disks.

In the present embodiment, the stereoscopic video camera 756 comprises a pair of charge coupled devices (CCDs) with respective optics, an LED indicator, and hardware-based real-time data compression and encoding apparatus so that compressed video data may be transmitted in an appropriate format such as an intra-image based MPEG (motion picture expert group) standard for decoding by the system unit 10. The camera LED indicator is arranged to illuminate in response to appropriate control data from the system unit 10, for example to signify adverse lighting conditions. Embodiments of the stereoscopic video camera 756 may variously connect to the system unit 10 via a USB, Bluetooth or Wi-Fi communication port. Embodiments of the video camera may include one or more associated microphones and are also capable of transmitting audio data. In embodiments of the video camera, the CCDs may have a resolution suitable for high-definition video capture. In use, images captured by the video camera may for example be incorporated within a game or interpreted as game control inputs.

In general, in order for successful data communication to occur with a peripheral device such as a stereoscopic video camera or remote control via one of the communication ports of the system unit 10, an appropriate piece of software such as a device driver should be provided. Device driver technology is well-known and will not be described in detail here, except to say that the skilled man will be aware that a device driver or similar software interface may be required in the present embodiment described.

In an embodiment of the present invention, the camera 756 is not necessarily used to capture the stereo image (or may have captured it previously) and hence may not itself be a stereoscopic camera, or not currently operating in a stereoscopic mode (as applicable), but is used to obtain an image of the user(s) for head tracking. As noted previously, head tracking may be used to generate a respective viewpoint of the 3D model so that a user can look around within the scene. Where two or more users are viewing the scene, then optionally two or more views may be rendered for respective display to each user (for example using active shutter glasses).

In an embodiment of the present invention, augmenting a first stereoscopic image comprising a pair of images involves generating a disparity map from the pair of images of the first stereoscopic image, the disparity map being indicative of distances in the first stereoscopic image; generating a virtual three-dimensional model responsive to the distances indicated by the disparity map, thereby creating an approximate 3D model of the scene captured in the first stereoscopic image; modeling an interaction of a virtual object with that three dimensional model; and outputting for display an image corresponding to the first stereoscopic image that comprises a visible effect of the interaction of the virtual object with the three dimensional model.

Optionally, the step of generating a three-dimensional model in turn comprises a sub-step of defining a series of value ranges corresponding to disparity values of the disparity map, each value range in the series having an end point corresponding to a greater disparity than an end point of preceding value ranges in the series; a sub-step of selecting points in the disparity map falling within the respective value range; a sub-step of generating a respective mesh responsive to those selected points; and a sub-step of merging the resulting series of generated meshes to form the 3D model of the scene.

Optionally, the virtual object has one or more physical attributes associated with it, and the interaction of the virtual object with the three dimensional model is responsive to the or each physical attribute.

Consequently, if the displayed image is an augmented version of at least one of the pair of images of the first stereoscopic image the method may comprise the step of augmenting the or each image of the first stereoscopic image with the virtual object at a position responsive to its interaction with the three dimensional model.

Optionally, the method further comprises a step of generating at least a first texture from one or both of the pair of images of the stereoscopic image; a step of applying the texture to at least a respective part of the three dimensional model; and a step of rendering (at least in an internal memory, and not necessarily for display) the textured three dimensional model together with the virtual object.

Consequently, if the virtual object has one or more physical attributes associated with it, and the interaction of the virtual object with the three dimensional model is responsive to the or each physical attribute, then the displayed image may comprise the rendered textured three dimensional model with the virtual object at a position responsive to its interaction with the three dimensional model.

Similarly consequently, the virtual object may comprise a light source, and the rendered textured three dimensional model may be illuminated responsive to that light source.

In this case, optionally if the displayed image is an augmented version of at least one of the pair of images of the first stereoscopic image, the method may comprise a step of calculating a difference map indicating the differences in rendered pixel values between rendering the textured three dimensional model with and without the light source of the virtual object; and a step of applying that difference map to the at least one of the pair of images of the first stereoscopic image to generate the displayed image.

Similarly in this case, if the displayed image comprises the rendered textured three dimensional model, this may be illuminated responsive to the light source of the virtual object.

Again dependent upon the generating and applying a texture to the model, the rendering of the textured three dimensional model with the virtual object may be performed for one or more viewpoints other than those of the pair of images of the first stereoscopic image, so as to generate a new view of the scene depicted in the first stereoscopic image.

In this case, the selection of the viewpoint(s) may be based upon a step of tracking the position of a user's head with respect to a display; and a step of calculating the or each viewpoint for rendering, responsive to the deviation of the user's head from a default viewpoint (i.e. the viewpoint of the original stereo image). The effect of this tracking and rendering process is that as the user moves their head, the image is recomposed for the new viewpoints (including where necessary filling in occluded pixels as described previously), so that it looks as though there is a 'real' 3D space behind the display screen that can be looked around.

It will be appreciated that in this case it is not necessary to include the steps of modeling an interaction of a virtual object with the three dimensional model or displaying a visible effect of such an interaction, if only the ability to look at different viewpoints is desired.

Meanwhile, an entertainment device 10 (such as the Sony PS3 or PS Vita) for augmenting a first stereoscopic image (for example an image captured from a stereoscopic camera 756 in communication with the entertainment device, or from a still or video file stored on the hard disk 400 or BD Rom 440) comprising a pair of images, itself comprises input means (such as WiFi 730, Bluetooth 740, and USB 710) operable to receive the first stereoscopic image data;

disparity processing means (such as the Cell processor 100 and/or RSX 200) operable to generate a disparity map from the pair of images of the first stereoscopic image, the disparity map being indicative of distances in the first stereoscopic image; virtual modeling means (such as the Cell processor 100 and/or RSX 200) operable to generate a virtual three-dimensional model responsive to the distances indicated by the disparity map; interaction modeling means (such as the Cell processor 100 and/or RSX 200) operable to model an interaction of a virtual object with that three dimensional model; and output means (such as the RSX 200) operable to output for display an image corresponding to the first stereoscopic image that comprises a visible effect of the interaction of the virtual object with the three dimensional model.

Optionally, the entertainment device also comprises texture generation means (such as the Cell processor 100 and/or RSX 200) operable to generate at least a first texture from one or both of the pair of images of the stereoscopic image; texturing means (such as the RSX 200) operable to apply the texture to at least a respective part of the three dimensional model; and rendering means (such as the RSX 200) operable to render the textured three dimensional model together with the virtual object.

Hence in summary, the above techniques and apparatus enable the analysis of a stereo image (such as a photo or a live or pre-recorded video frame), the generation of a 3D model comprising a mesh of polygons representative of the physical layout of the scene in the stereo image, and then the output of a stereo image responsive to that 3D model, either in the form of an augmented version of the original stereo image (for example with additional virtual lighting or objects), or a render of the 3D model with textures derived from the original stereo image, either rendered from the same viewpoint(s) as the original image, or from another viewpoint that in turn may be responsive to tracking the head or eye position of a person viewing the image.

An issue that may arise however, particularly in the final case listed above of a render from a different viewpoint, is that the meshes of the 3D model may not perfectly track the edges of objects in the scene, if only because the vertex points of the polygons in the mesh are a subsample of the actual points in the image. As a result, when generating textures for these meshes from the image, the textures may undesirably include colour information from adjacent features of the scene as viewed from the original viewpoint, because some pixels in the original image(s) corresponding to positions of polygons in the mesh may in fact belong to background features.

Figure 8:
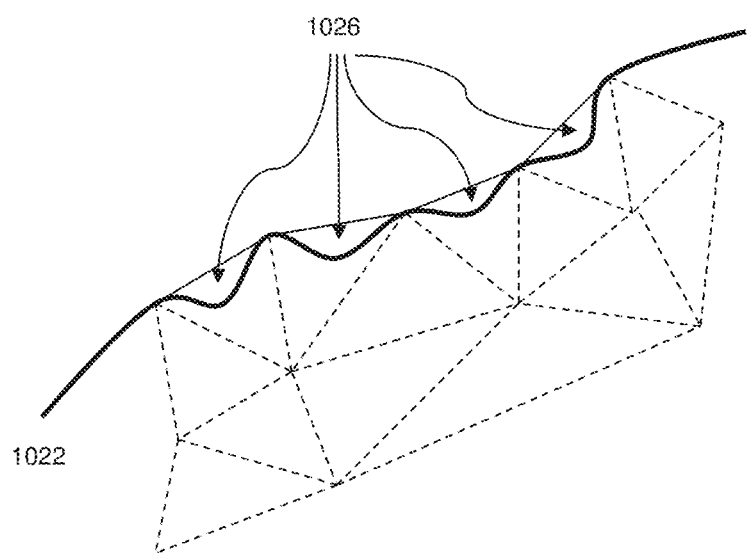
FIG. 8 is a schematic diagram of a polygon mesh at the edge of an object, in accordance with an embodiment of the present invention.

This is illustrated in FIG. 8, where a line 1022 represents the actual edge of an object (for example the rumpled surface of the child's coat), whilst the triangles form a mesh representing the child and approximating this edge (in the triangles, the solid lines represent sides of the triangles on the edge of the coat, whilst the dashed lines represent sides that are further from the edge). Because the textures for the mesh are derived from the original image, the regions 1026 outside the actual edge of the coat but within the polygons of the mesh representing the coat will include colour information from the background behind the coat in the original image.

Hence for example with reference to the captured stereo image of FIG. 1, which shows a child standing partially in front of a brown clock and a blue wall, it is possible that the texture applied to the mesh representing the child (located in layer 3 in the above example of mesh generation) will comprise some brown and/or blue from the clock and the wall behind.

When the 3D model with these textures is rendered from the original viewpoint, these errors are unlikely to be noticeable because the errors in the foreground textures are exactly aligned in front of the background that the errors are derived from.

However, if the image is viewed from a different angle, the errors in the foreground textures are likely to become visible as they no longer exactly match the background. For example, the rendered viewpoint of the image may be moved so that the child appears to be wholly in front of the clock, but he may retain a partial blue edging originally derived from the wall. Conversely, a brown edge derived from the clock may remain on part of the child even as the viewpoint moves the child away from the clock.

These texture errors spoil the illusion that the user is genuinely looking around a real scene in miniature on their display.

In order to mitigate this problem, in an embodiment of the present invention the rendered scene is modified as described below.

In an embodiment of the present invention, an edge softening process (implemented for example by the Cell processor under suitable software instruction) works on a layer by layer and structure-by-structure basis, or more generally on a foreground to background basis, when rendering the 3D model.

Preferably starting with the closest polygons of the mesh and working back, if the Cell processor finds a polygon that is connected to other polygons but has at least one side unconnected (i.e. not shared between two polygons), then this is identified as an edge polygon. The Cell processor then traverses this edge to identify all the unconnected sides along it. Referring back to FIG. 8, the solid lines of the triangles in this Figure are thus unconnected sides in a single edge.

To mitigate for the fact that there may be texture errors near these edges as described above, the transparency of the rendered object can be modified as a function of its distance from the edge to form a transparency gradient. Hence the object can be fully transparent at the edge itself, and become fully opaque at a predefined distance from that edge (as a non-limiting example, between 1 and 10 pixels from the edge; the value is likely to be proportional to the resolution of the source image).

Optionally, rather than using the edge itself as a baseline for the transparency gradient, a spline may be drawn through the edge. The spline will substantially follow the edge but not have sharp points. The transparency may then be modified as a function of the signed distance from the spline, being transparent at any point on the edge side of the spline and optionally on the spline itself, and becoming fully opaque at a predefined distance from that spline on the object side of the spline (again as a non-limiting example, between 1 and 10 pixels from the spline).

In either case, the transparency gradient advantageously removes or de-emphasises texture errors at or near the edge of the object. Additionally in the case of the spline embodiment it also gives the impression that the object is less sharp and angular, resulting in a more natural representation of the object with respect to the original image.

As noted previously herein, the mesh (for example in FIG. 3B) is typically formed of shells (i.e. curved or flat open surfaces) rather than closed surfaces, and so the polygons with unconnected sides forming the edges of objects in the original image typically correspond to the edges of such shells. Where, optionally, a shell is subsequently closed using additional polygons to form a closed surface (as in the mesh in layer 3 in FIG. 3C), then optionally the additional polygons can be ignored for the purposes of the edge softening process, or if the edge softening process is performed after a z-cull or similar polygon pruning process during rendering, they may be automatically discounted in consequence.

In the above process, the edge is identified using unconnected sides of polygons, but similarly it may be detected using the connectedness of polygon vertices. For example, a polygon vertex unconnected to any other polygon may represent the end of an edge. The edge may then be tracked along unconnected sides of the polygons or similarly along successive vertices that are not enclosed by polygons sharing the same vertex point.

In either case, the edge softening process mitigates the texture errors that can arise from generating textures from an original image to be applied to a mesh derived from that image in order to render that mesh from a different viewpoint to that of the original image.

Figure 9:
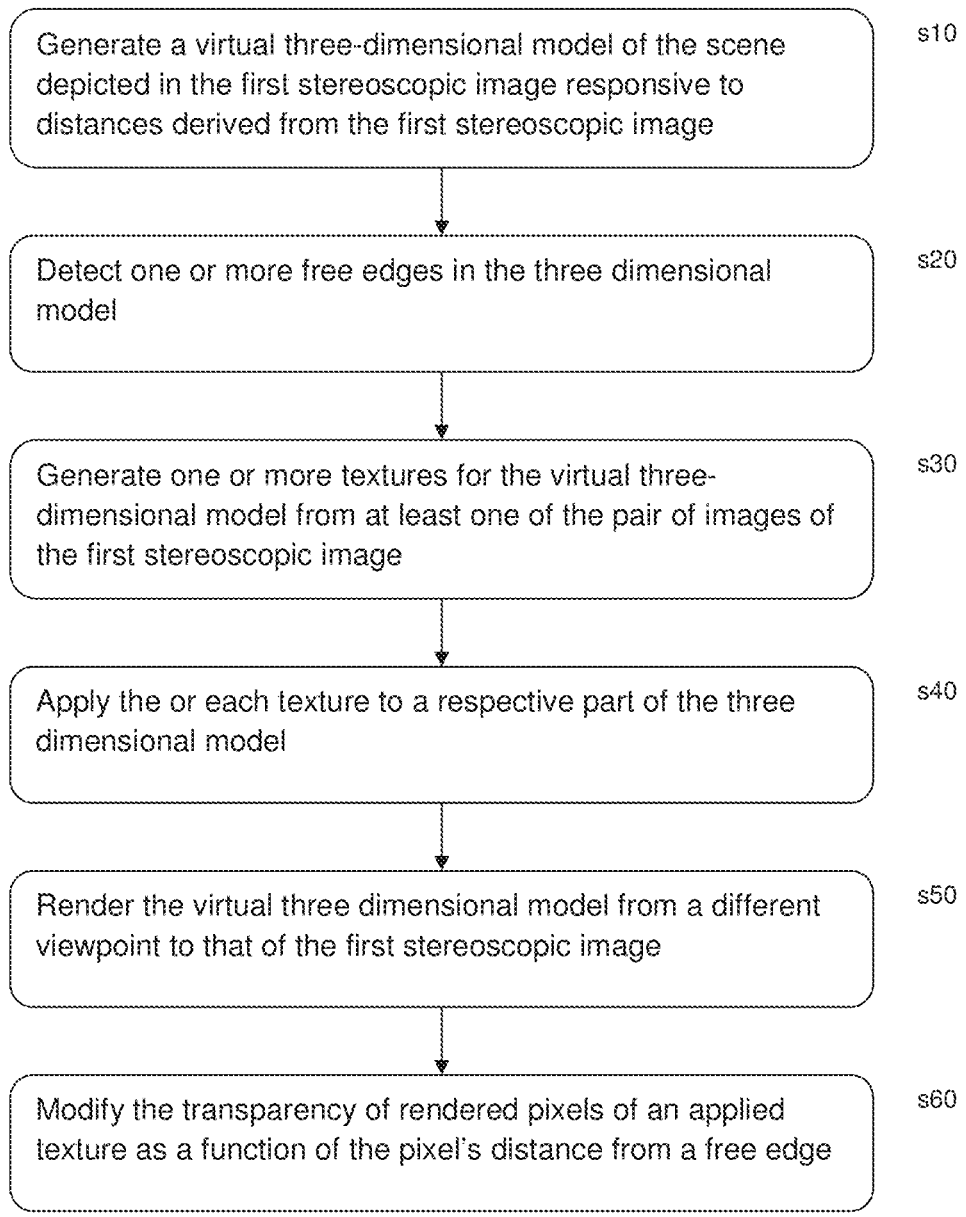
FIG. 9 is a flow diagram of a method of image rendering in accordance with an embodiment of the present invention.

Hence, referring now to FIG. 9, in a summary embodiment of the present invention, a method of rendering an image based upon a first stereoscopic image (itself comprising a pair of images) comprises in a first step s10, generating a virtual three-dimensional model of the scene depicted in the first stereoscopic image responsive to distances derived from the first stereoscopic image, for example using the mesh generation techniques described herein; in a second step s20, detecting one or more free edges in the three dimensional model; in a third step s30, generating one or more textures for the virtual three-dimensional model from at least one of the pair of images of the first stereoscopic image; in a fourth step s40, applying the or each texture to a respective part of the three dimensional model; and in a fifth step s50, rendering the virtual three dimensional model from a different viewpoint to that of the first stereoscopic image, where the step of rendering the virtual three dimensional model in turn comprises a sixth step s60 of modifying the transparency of rendered pixels of an applied texture as a function of the pixel's distance from that free edge.

It will be appreciated that the above steps may be carried out in a different order and/or at least partially in parallel. For example, step s40 may be part of step s50, and the modification of the transparency of the rendered pixels will typically comprise setting an alpha (transparency) value for the pixels during the rendering process.

In an instance of the summary embodiment, the step of detecting one or more free edges in the virtual three dimensional model comprises detecting at least a first polygon with a side that is not shared with another polygon.

Alternatively, in an instance of the summary embodiment, the step of detecting one or more free edges in the virtual three dimensional model comprises detecting at least a first polygon with a vertex that is not shared with another polygon.

In an instance of the summary embodiment, the step of modifying the transparency comprises generating a gradient of pixel transparency values over a predetermined distance from a free edge of the virtual three dimensional model such that pixels are more transparent at the edge of the virtual three dimensional model. As noted previously, it will be understood that the gradient proceeds inwards from the edge of the object towards the body of the object.

Alternatively or in addition, in an instance of the summary embodiment the step of modifying the transparency comprises generating a spline fit to a free edge of the virtual three dimensional model, and generating a gradient of pixel transparency values over a predetermined distance from that spline, such that pixels are more transparent at the spline. As noted previously, the spline will approximate but not exactly fit the edge defined by the polygon. Consequently rendered pixels of an applied texture lying between the spline and the free edge will be transparent, and the gradient will apply at the spline and progress onwards towards the body of the object.

In an instance of the summary embodiment, the step of generating a virtual three-dimensional model of the scene depicted in the first stereoscopic image comprises in turn the steps of generating a disparity map from the pair of images of the first stereoscopic image (the disparity map being indicative of distances in the first stereoscopic image), defining a series of value ranges corresponding to disparity values of the disparity map where each value range in the series having an end point corresponding to a greater disparity than an end point of preceding value ranges in the series, selecting points in the disparity map falling within the respective value range, generating a respective mesh responsive to those selected points, and merging the resulting series of generated meshes to form the 3D model of the scene.

In an instance of the summary embodiment, the method comprises the step of modeling an interaction of a virtual object with the virtual three dimensional model, and the step of rendering the virtual three dimensional model comprises rendering a visible effect of the interaction of the virtual object with the three dimensional model.

In an instance of the summary embodiment, the step of rendering the virtual three dimensional model from a different viewpoint comprises the steps of tracking the position of a user's head with respect to a display, and calculating the or each viewpoint for rendering responsive to the deviation of the user's head from a default viewpoint.

Meanwhile, in the summary embodiment of the present invention, an entertainment device such as the Sony PS3 (10) for rendering an image based upon a first stereoscopic image (comprising a pair of images) comprises virtual modeling means (e.g. Cell processor 100) operable to generate a virtual three-dimensional model of the scene depicted in the first stereoscopic image, responsive to distances derived from the first stereoscopic image, model edge detection means (e.g. Cell processor 100 and/or RSX 200) operable to detect one or more free edges in the three dimensional model, texture generation means (e.g. Cell processor 100 and/or RSX 200) operable to generate one or more textures for the virtual three-dimensional model from at least one of the pair of images of the first stereoscopic image, texture application means (e.g. RSX 200 and/or Cell processor 100) operable to apply the or each texture to a respective part of the three dimensional model; and rendering means (e.g. RSX 200 optionally in conjunction with the Cell processor 100) operable to render the virtual three dimensional model from a different viewpoint to that of the first stereoscopic image, in which the rendering means is operable to modify the transparency of rendered pixels of an applied texture as a function of the pixel's distance from a free edge.

In an instance of the summary embodiment, the rendering means is operable to generate a gradient of pixel transparency values over a predetermined distance from a free edge of the virtual three dimensional model such that pixels are more transparent at the edge of the virtual three dimensional model.

Alternatively or in addition, in an instance of the summary embodiment the rendering means is operable to generate a spline fit to a free edge of the virtual three dimensional model, and to generate a gradient of pixel transparency values over a predetermined distance from that spline, such that pixels are more transparent at the spline.

In an instance of the summary embodiment, the virtual modeling means comprises disparity map generating means (e.g. the Cell processor 100) operable to generate a disparity map from the pair of images of the first stereoscopic image, the disparity map being indicative of distances in the first stereoscopic image, range setting means (e.g. the Cell processor 100) operable to define a series of value ranges corresponding to disparity values of the disparity map with each value range in the series having an end point corresponding to a greater disparity than an end point of preceding value ranges in the series, selection means (e.g. the Cell processor 100) operable to select points in the disparity map falling within the respective value range, mesh generating means (e.g. the Cell processor 100 and/or RSX 200) operable to generate a respective mesh responsive to those selected points, and mesh merging means (e.g. the Cell processor 100 and/or RSX 200) operable to merge the resulting series of generated meshes to form the 3D model of the scene.

In an instance of the summary embodiment, the entertainment device comprises a virtual object interaction modeling means (e.g. the Cell processor 100) operable to model an interaction of a virtual object with the virtual three dimensional model, and the rendering means is operable to render a visible effect of the interaction of the virtual object with the three dimensional model.

Finally, in an instance of the summary embodiment, the entertainment device comprises input means (e.g. USB port 710, Bluetooth port 740, or WiFi port 730) for head tracking information for a user's head (for example via a video camera or an accelerometer/gyroscope motion sensor similar to that in the controller 751 and worn by the user, for example in a pair of active shutter glasses), and calculating means (e.g. the Cell processor 100) operable to calculate the or each viewpoint for rendering responsive to the deviation of the user's head from a default viewpoint, and in which the or each viewpoint from which the virtual three dimensional model is rendered is based upon the or each calculated viewpoint.

It will be appreciated that the methods disclosed herein may be carried out on conventional hardware suitably adapted as applicable by software instruction or by the inclusion or substitution of dedicated hardware, such as the Sony PS Vita® or the PS3® described above.

Thus the required adaptation to existing parts of a conventional equivalent device may be implemented in the form of a non-transitory computer program product or similar object of manufacture comprising processor implementable instructions stored on a data carrier such as a floppy disk, optical disk, hard disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, if applicable the computer program may take the form of a transmission via data signals on a network such as an Ethernet, a wireless network, the Internet, or any combination of these or other networks.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A method of rendering an image based upon a first stereoscopic image comprising a pair of images, the method comprising the steps of:
    generating a virtual three-dimensional model of a scene depicted in the first stereoscopic image responsive to distances derived from the first stereoscopic image;
    detecting one or more free edges in the virtual three dimensional model;
    generating, by one or more processors, one or more textures for the virtual three-dimensional model from at least one of the pair of images of the first stereoscopic image;
    applying, by the one or more processors, at least one of the one or more textures to a respective part of the virtual three dimensional model; and
    rendering, by the one or more processors, the virtual three dimensional model from a different viewpoint to that of the first stereoscopic image;
    wherein rendering the virtual three dimensional model comprises modifying a transparency of rendered pixels of an applied texture as a function of each pixel's distance from a given one of the free edges; and
    wherein the rendering further includes generation of a texture for at least one polygon comprising color information from foreground and background elements of the scene;
    in which generating a virtual three-dimensional model of the scene depicted in the first stereoscopic image comprises:
        generating a disparity map from the pair of images of the first stereoscopic image, the disparity map being indicative of distances in the first stereoscopic image;
        defining a series of value ranges corresponding to disparity values of the disparity map, each value range in the series having an end point corresponding to a greater disparity than an end point of preceding value ranges in the series;
        selecting points in the disparity map falling within the respective value range;
        generating a respective mesh responsive to those selected points; and
        merging generated meshes to form the 3D model of the scene.

2. A method according to claim 1, in which the step of detecting one or more free edges in the virtual three dimensional model comprises detecting at least a first polygon with a side that is not shared with another polygon.

3. A method according to claim 1, in which the step of detecting one or more free edges in the virtual three dimensional model comprises detecting at least a first polygon with a vertex that is not shared with another polygon.

4. A method according to claim 1, in which the step of modifying the transparency comprises:
generating a gradient of pixel transparency values over a predetermined distance from the given one of the free edges of the virtual three dimensional model such that pixels are more transparent at the edge of the virtual three dimensional model.

5. A method according to claim 1, in which the step of modifying the transparency comprises:
generating a spline fit to the given one of the free edges of the virtual three dimensional model; and
generating a gradient of pixel transparency values over a predetermined distance from that spline, such that pixels are more transparent at the spline.

6. A method according to claim 1, comprising the step of modelling an interaction of a virtual object with the virtual three dimensional model; and in which the step of rendering the virtual three dimensional model comprises rendering a visible effect of the interaction of the virtual object with the three dimensional model.

7. A method according to claim 1, in which the step of rendering the virtual three dimensional model from a different viewpoint comprises the steps of:
tracking a position of a user's head with respect to a display; and
calculating one or more viewpoints for rendering responsive to a deviation of the user's head from a default viewpoint.

8. A non-transitory computer program product comprising computer implementable instructions that when run cause a computer to implement a method of rendering an image based upon a first stereoscopic image comprising a pair of images, the method comprising the steps of:
generating a virtual three-dimensional model of a scene depicted in the first stereoscopic image responsive to distances derived from the first stereoscopic image;
detecting one or more free edges in the virtual three dimensional model;
generating one or more textures for the virtual three-dimensional model from at least one of the pair of images of the first stereoscopic image;
applying at least one of the one or more textures to a respective part of the virtual three dimensional model; and
rendering the virtual three dimensional model from a different viewpoint to that of the first stereoscopic image;
wherein rendering the virtual three dimensional model comprises modifying a transparency of rendered pixels of an applied texture as a function of each pixel's distance from a given one of the free edges; and
wherein the rendering further includes generation of a texture for at least one polygon comprising color information from foreground and background elements of the scene;
in which generating a virtual three-dimensional model of the scene depicted in the first stereoscopic image comprises:
generating a disparity map from the pair of images of the first stereoscopic image, the disparity map being indicative of distances in the first stereoscopic image;
defining a series of value ranges corresponding to disparity values of the disparity map, each value range in the series having an end point corresponding to a greater disparity than an end point of preceding value ranges in the series;
selecting points in the disparity map falling within the respective value range;
generating a respective mesh responsive to those selected points; and
merging generated meshes to form the 3D model of the scene.

9. An entertainment device for rendering an image based upon a first stereoscopic image comprising a pair of images, the entertainment device comprising:
virtual modelling means for generating a virtual three-dimensional model of a scene depicted in the first stereoscopic image, responsive to distances derived from the first stereoscopic image;
model edge detection means for detecting one or more free edges in the virtual three dimensional model;
texture generation means for generating one or more textures for the virtual three-dimensional model from at least one of the pair of images of the first stereoscopic image;
texture application means for applying at least one of the textures to a respective part of the virtual three dimensional model; and
rendering means for rendering the virtual three dimensional model from a different viewpoint to that of the first stereoscopic image;
wherein the rendering means is operable to modify a transparency of rendered pixels of an applied texture as a function of each pixel's distance from a given one of the free edges; and
wherein the rendering means is further operable to generate a texture for at least one polygon comprising color information from foreground and background elements of the scene
in which the virtual modelling means comprises:
disparity map generating means for generating a disparity map from the pair of images of the first stereoscopic image, the disparity map being indicative of distances in the first stereoscopic image;
range setting means for defining a series of value ranges corresponding to disparity values of the disparity map, each value range in the series having an end point corresponding to a greater disparity than an end point of preceding value ranges in the series;
selection means for selecting points in the disparity map falling within the respective value range;
mesh generating means for generating a respective mesh responsive to those selected points; and
mesh merging means for merging generated meshes to form the 3D model of the scene.

10. An entertainment device according to claim 9, in which the rendering means is operable to generate a gradient of pixel transparency values over a predetermined distance from the given one of the free edges of the virtual three dimensional model such that pixels are more transparent at the edge of the virtual three dimensional model.

11. An entertainment device according to claim 9, in which the rendering means is operable to generate a spline fit to the given one of the free edges of the virtual three dimensional model, and to generate a gradient of pixel transparency values over a predetermined distance from that spline, such that pixels are more transparent at the spline.

12. An entertainment device according to claim 9, comprising:
virtual object interaction modelling means for modeling an interaction of a virtual object with the virtual three dimensional model; and in which the rendering means is operable to render a visible effect of the interaction of the virtual object with the three dimensional model.

13. An entertainment device according to claim 9, comprising:
   input means for head tracking information for a user's head; and
   calculating means for calculating one or more viewpoints for rendering responsive to a deviation of the user's head from a default viewpoint; and in which
   the one or more viewpoints from which the virtual three dimensional model is rendered is based upon respective calculated viewpoints.

\* \* \* \* \*